April 18, 1961
S. TESZNER
2,980,809
SEMI-CONDUCTOR DEVICES FOR RECTIFYING AND
CLIPPING LARGE ELECTRICAL CURRENTS
Filed Dec. 9, 1957
10 Sheets-Sheet 1
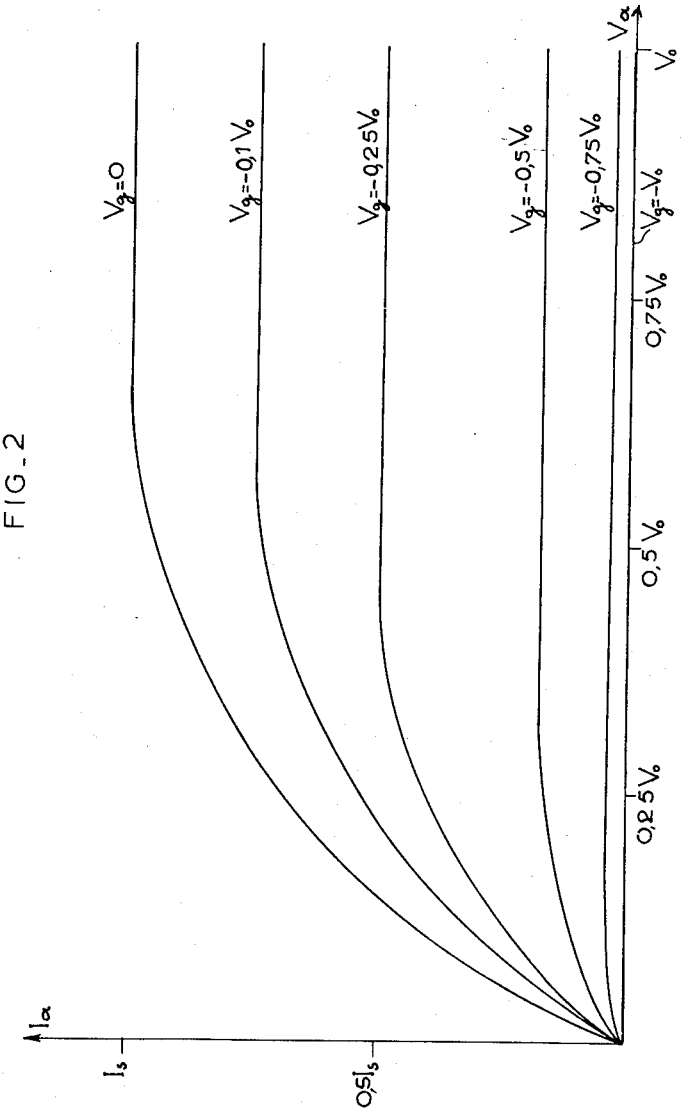
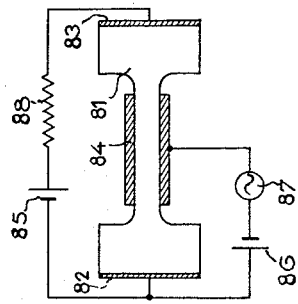
STANISLAS TESZNER
INVENTOR
By: A.A. SAFFITZ
Attorney April 18, 1961  S. TESZNER  2,980,809
SEMI-CONDUCTOR DEVICES FOR RECTIFYING AND
CLIPPING LARGE ELECTRICAL CURRENTS
Filed Dec. 9, 1957  10 Sheets-Sheet 2

STANISLAS TESZNER
INVENTOR

By A.A. SAFFITZ
Attorney

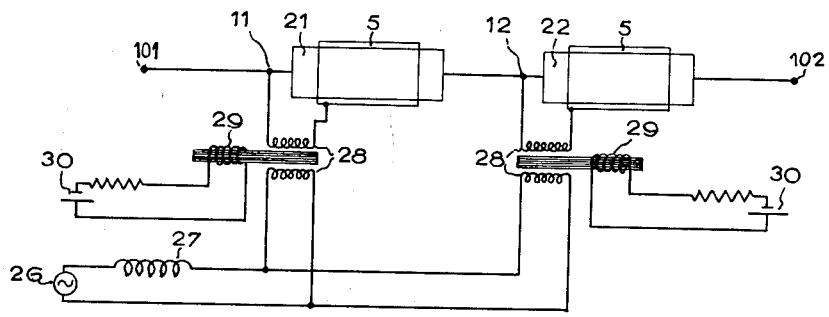
FIG_5
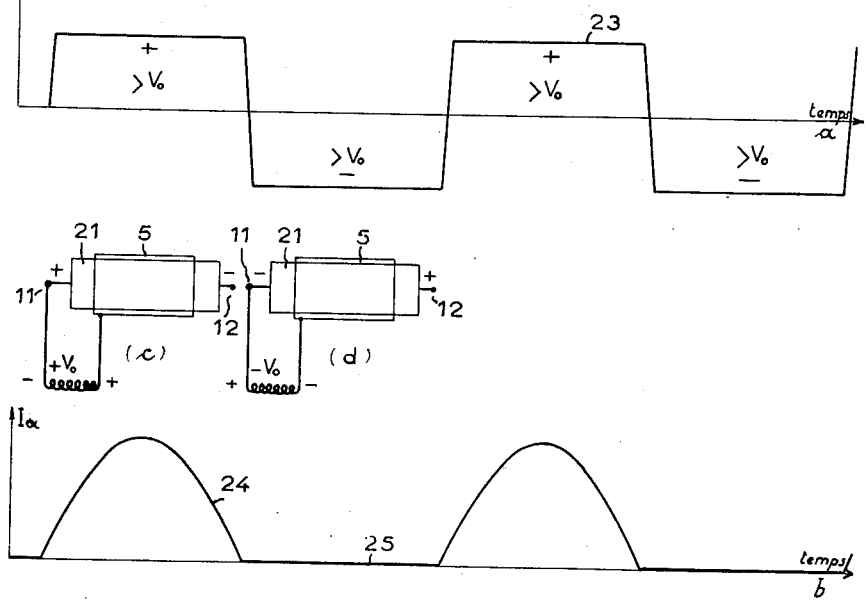
FIG_6

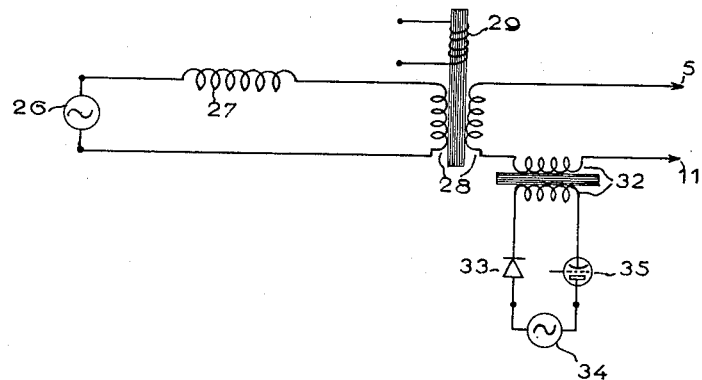
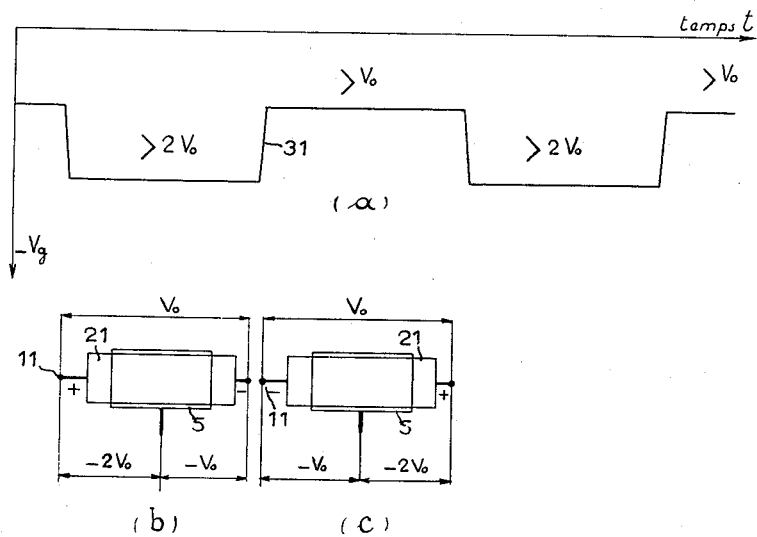

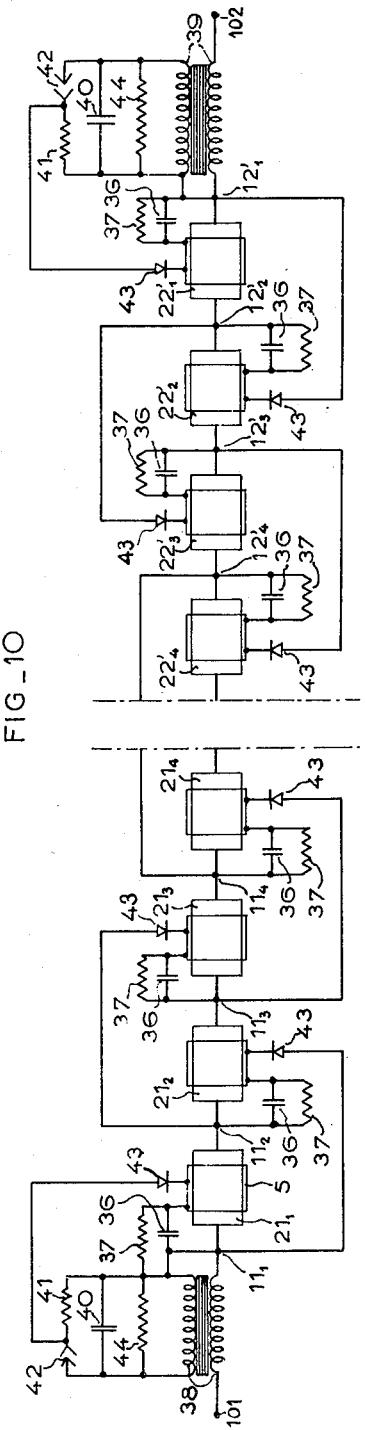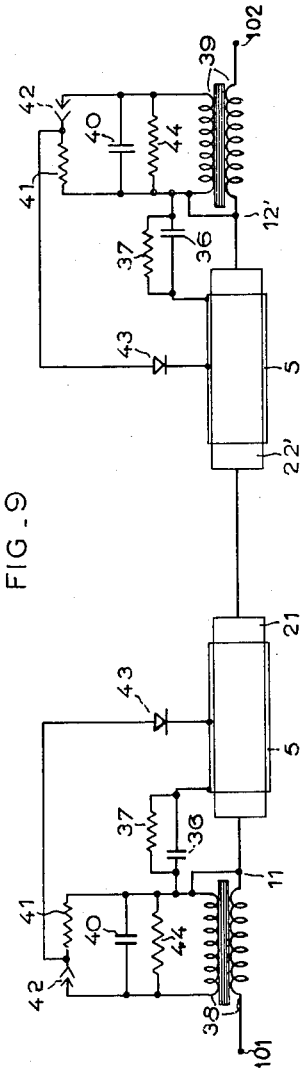

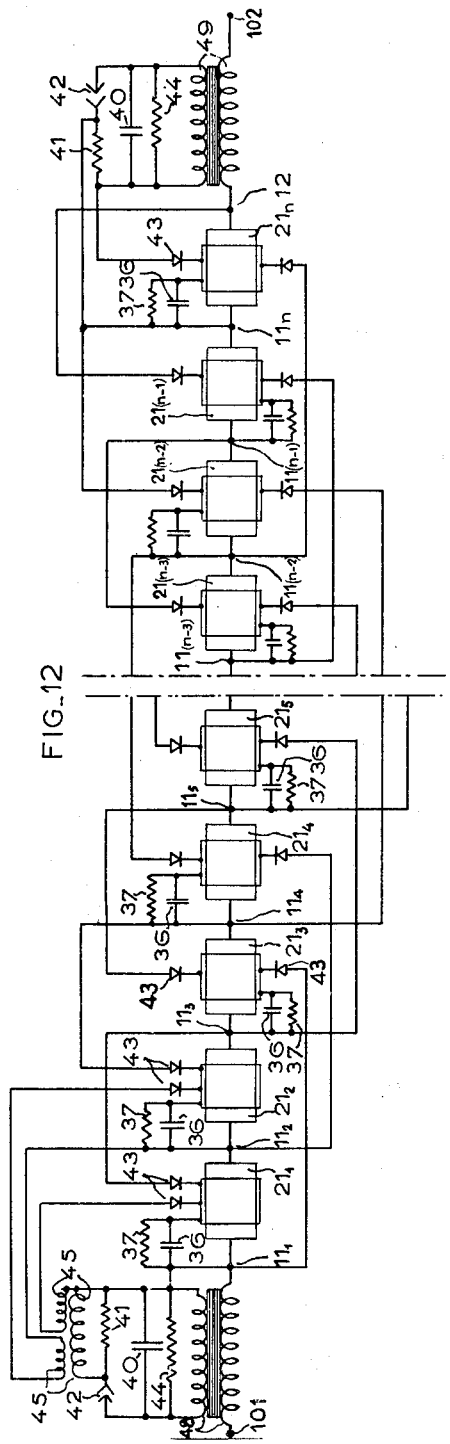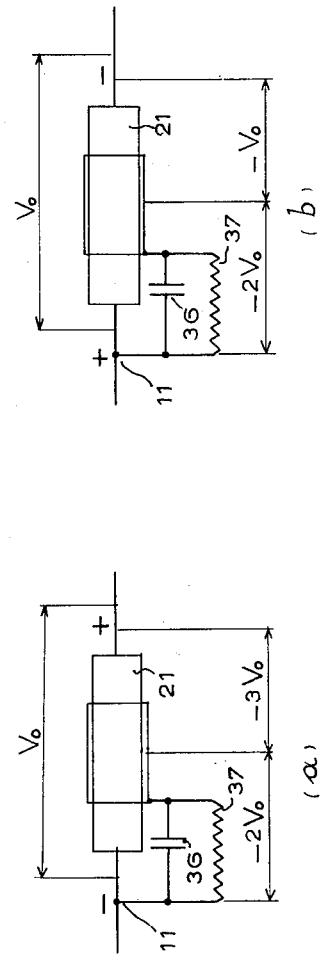

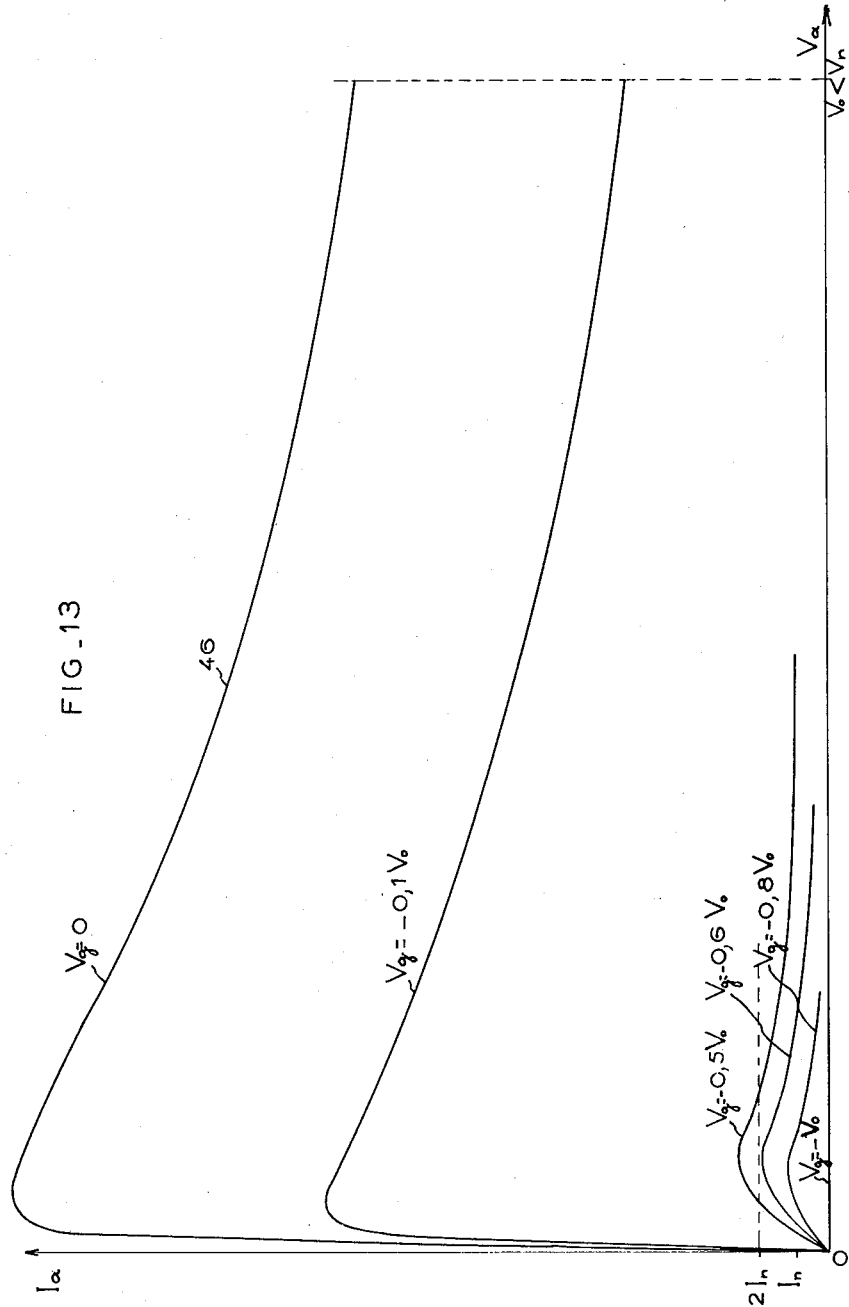

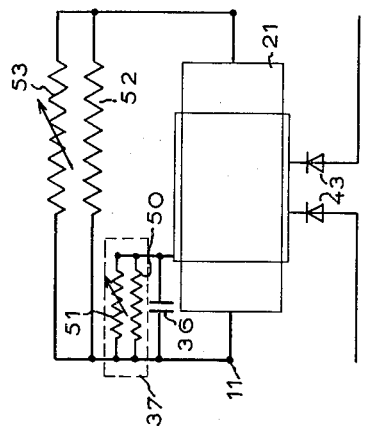
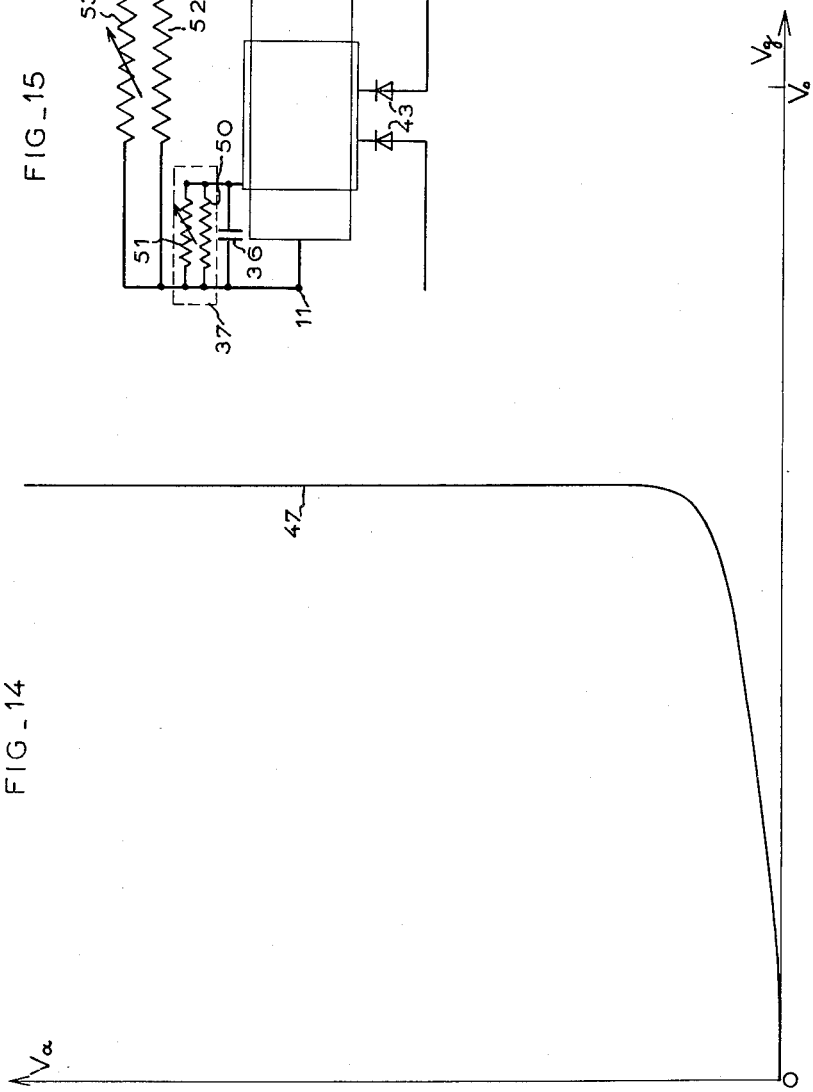

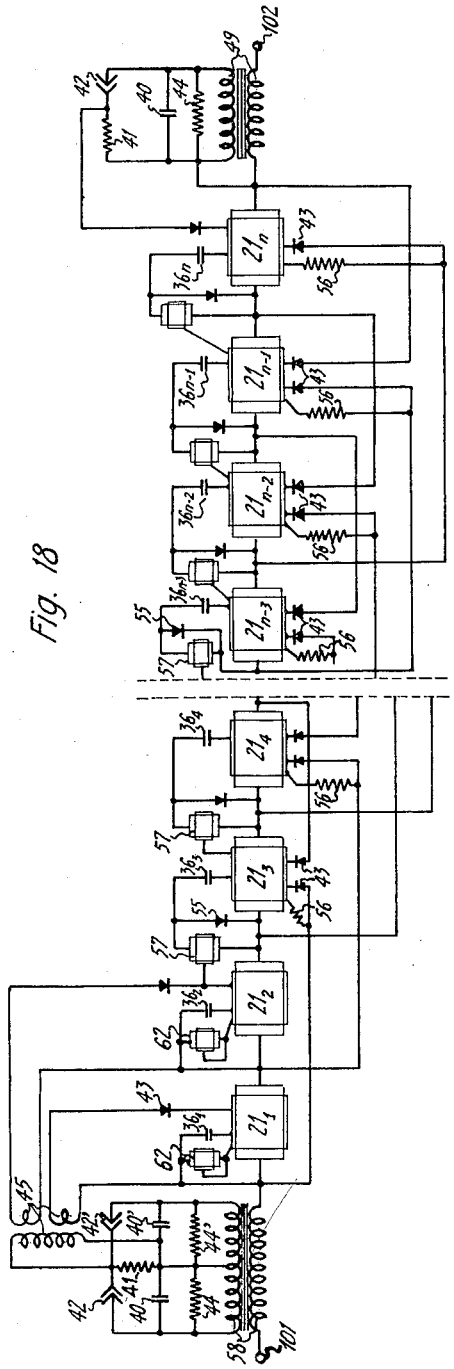
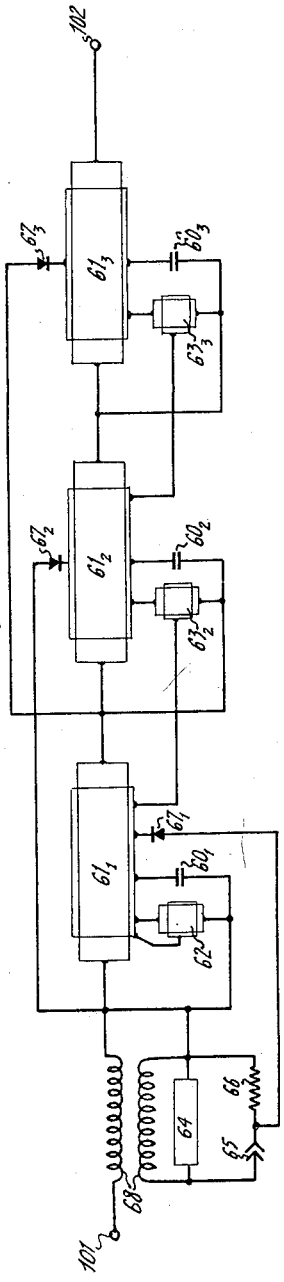
Fig. 18
Fig. 19

United States Patent Office 2,980,809
Patented Apr. 18, 1961

2,980,809
SEMI-CONDUCTOR DEVICES FOR RECTIFYING AND CLIPPING LARGE ELECTRICAL CURRENTS
Stanislas Teszner, 49 Rue de la Tour, Paris, France
Filed Dec. 9, 1957, Ser. No. 701,478
Claims priority, application France Dec. 12, 1956
11 Claims. (Cl. 307—88.5)

The present invention relates to semi-conductor devices for rectifying and clipping large electrical currents.

The current-rectifying properties of semi-conductor devices having a junction between semi-conductive monocrystals of opposite types of conductivity are already known. These junctions, referred to as n-p junctions are generally made of germanium or silicon. With such devices, rectification of relatively high powers can be obtained for a small volume. Rectifying efficiency is remarkable, attaining 97 to 99% and markedly in excess of that featured by all other rectifiers known to date.

However, such devices also feature certain drawbacks that cannot be neglected.

In the first instance, they do not stand up very well to current overloads resulting from partial or total short-circuiting of the load: this is due to the fact that, with rectifiers of that nature, the current-voltage characteristics in the forward direction (direction of unopposed current flow) show a sharp current rise immediately the potential across the terminals of the junction approaches the width of the forbidden band of the semi-conductor utilized (for example: 0.72 volt for germanium and 1.03 volts for silicon). The natural resistance of the junction then drops to practically zero and the resistance of the rectifier drops to that of the semi-conductors in series and of the connection leads. Consequently, there is no self-regulation of the current by the rectifier. In the case of total load short-circuit, this current is practically limited solely by the impedance of the source and can reach amplitudes largely exceeding ten times the value of the working voltage. Since a rectifier of that nature normally operates with relatively high densities of working current, in the order of 100 amperes per cm.$^2$, such densities assume excessive proportions when short circuit conditions obtain. Hence the necessity for protecting the rectifier by means of an ultra-fast operate circuit breaker, an item of relatively difficult construction which markedly increases the cost of the equipment.

In the second instance, such rectifiers show poor suitability to series combination of the elements, a necessary combination when currents have to be rectified under high working voltages. This condition is due to the fact that their "reverse resistance" (direction of opposed current flow) differs widely from one element to the other. For that reason, it is difficult to obtain a satisfactory distribution of voltage in the elements and this makes it necessary to observe considerable safety margins.

In actual fact, not only have the rectifying elements no self-regulating action over the voltage distribution, but there exist no possible means of action over these elements to regulate the voltage distribution.

Finally, the loss in power within the rectifier may be indeed very slight but it is by no means negligible. The evacuation of the resulting heat entails the use of radiators necessitating a considerable increase of rectifier bulk. The heating effect is particularly troublesome for germanium junction rectifiers which have a maximum operating temperature in the order of 80° C., and to a lesser extent for silicon rectifiers which will accept temperatures in the order of 150 to 200° C., although, here also, relatively bulky radiators are essential.

Self-limitation of the current and a measure of regulation of the distribution of the voltage in the elements in series could be achieved by means of a device utilizing two series junctions of opposite type of conductivity, generally referred to as n-p-n or p-n-p transistors: by suitably biasing the intermediate portion called the base it is possible to adjust the amplitude of the current flowing at a given voltage to render it practically unidirectional or to limit its amplitude. However, for rectifier applications, this device suffers from the major drawback of possessing excessive resistance that causes a prohibitive drop in potential. The same obtains when the device is utilized for current clipping applications. Now, the development of a current rectifier, particularly a high power rectifier, offering a low resistance to the current flow, lower than that offered by existing devices and yet enabling both automatic clipping of the overload current and adequate distribution of the voltage over the series elements, is of obvious interest. Such a device may prove extremely valuable, in particular in electrical traction applications and may open new vistas in the field of D.C. applications.

The interest offered by a current clipping device featuring practically no inertia in operation, which would be particularly suitable for heavy alternating current circuits and which would involve only a slight drop of potential across its terminals during normal operation, is even more certain: to date, no such device is available and yet, the availability of such a device is liable to deeply alter both the operation of electrical networks by greatly facilitating this operation, and the constructional specifications of all network elements such as motors, transformers, cables and contact gear, by freeing them of the serious limitations set by the necessity for correct performance under short-circuit conditions.

Finally, a current limiter, also without inertia, for direct current circuits in which no self-clipping by rectifier device is provided, will also prove extremely valuable.

The purpose of the present invention is to produce a device capable of functioning either as a rectifier or as an automatic current clipper, offering, as a rectifier, a forward resistance and, as a current clipper, a forward and reverse resistance that can practically be as low as desired . . . and yet assure a self current-clipping function and permit easy control of the voltage distribution in the respective elements. When these conditions obtain, such a device does not offer the various above mentioned drawbacks that are a feature of both rectifiers and junction transistors. It can be produced for all working voltages, provided the elements are connected in series, and for all working currents, provided the elements are connected in parallel.

The invention utilizes a device referred to as a "unipolar field-effect transistor." Transistors of that type are described notably in my copending patent application Ser. No. 701,670, filed December 9, 1957, now Patent No. 2,930,950.

It will be observed that the term "unipolar transistor" employed to designate these devices is improper, since such devices do not involve any transistance effects. The term will nevertheless be retained for the sake of adhering to common practice, but its impropriety is duly noted.

A unipolar transistor described in my above mentioned application takes the form of a plurality of cylindrical rods of monocrystal semi-conductive substance, such as germanium or silicon, for example, integral with a common base and fitted at both ends with an electrode in ohmic contact with the semi-conductor and with an intermediate electrode encircling the rod and separated from the semi-conductor body by a space charge consisting, for example, of a barrier surface, and, possibly, by an additional insulating film. By biasing the intermediate electrode with respect to the terminal electrodes, the current flowing from one terminal electrode to the other can be made to vary, practically at will, until it is suppressed almost completely. Such an effect is attributable to the fact that the depth of the space charges in the rod is a function of the transverse electric field and that such space charges may swamp the whole cross-section of the conductive channel within the rod, thereby blocking the conductive channel when a so-called "complete pinch-off" voltage is applied to the intermediate electrode.

This effect is particularly marked in the case of a cylindrical rod, where a veritable centripetal pinch-off of the conductive channel takes place, which pinch-off is exerted in a uniform manner, along all transverse directions, literally throttling the conductive channel. The intermediate electrode is referred to as the "gate" electrode and the terminal electrodes as "drain" and "source" electrodes respectively, it being understood that, in bi-directional flow conditions of operation, in the case of alternating current operation, the respective functions of the two terminal electrodes are inverted over each half-wave of current.

The invention consists, when the "field-effect" transistor operates in an alternating current rectifier function, in assuring the cutting-off of the current over every other half wave by biasing the gate with respect to the source electrode by means of a series of quasi-rectangular wave voltage pulses, the duration of the individual pulses and the gap between the pulses being equal to the duration of a half-wave and the amplitudes of the pulses being at least equal to that of the total pinch-off voltage. In the case of a rectifier embodying several elements in series, the bias voltages of these elements can be adjusted so that their respective resistances over the blocked half-wave period be practically the same for all elements, thereby assuring a uniform distribution of the reverse voltage in the elements. The invention also consists in assuring the cutting-off of the forward current in the event of partial or total short-circuiting of the load, such cut-off being obtained by means of a complemenary biasing of the gate, it being also understood that the presence of the gate electrode can be utilized to assure all other control functions, as would a control grid in a mercury vapour rectifier (but without the overloading hazards inherent to this latter device).

The invention consists, on the other hand, when the unipolar transistor is operated in an alternating current clipping function, in charging the gate electrode of at least one transistor with a voltage pulse in phase with the current, which pulse is produced immediately the predetermined current limit is reached. The invention also relates to the constitution of a chain of elements having on both sides at least one bounding element the biasing of which is assured by the above-defined voltage pulse; depending upon the particular current half-wave during which the predetermined limit is reached, the biasing pulse will be applied to the "up-stream" or the "down-stream" bounding element, the elements being interconnected in a manner such that the cutting-off of at least one terminal element causes the cutting-off in cascade of the other elements. The invention also relates to a system of automatic release within a predetermined time delay assuring the resumption of the operation, with current clipping operation possible immediately afterwards, should faulty conditions subsist, this sequence of operation being repeatable at will.

The invention also relates to a direct current clipper which is derived from the preceding device.

The principle of the invention will be explained, its embodiments will be described and its remarkable advantages will be brought out, with reference to the accompanying drawings in which:

Fig. 1 represents the circuit diagram of an earlier-type of cylindrical shape unipolar transistor of the prior art.

Fig. 2 shows the family of characteristic curves for such a transistor.

Fig. 5 and Fig. 6 represent in schematic form a power rectifier conforming to the invention, and a graph explaining its functioning.

Fig. 7 and Fig. 8 represent a complementary rectifier control circuit assuring the cutting-off of the forward current in the event of a short-circuit, and the graph explaining the functioning of the rectifier embodying such a device.

Fig. 9 is a diagram of principle of the automatic energizing of an alternating current clipper comprising two series elements.

Fig. 10 represents in schematic form a current clipper embodying several elements in cascade, comprising two chains of series elements.

Fig. 11 and Fig. 12 represent a graph explaining the functioning of, and a circuit diagram describing a current clipper embodying only one chain of series elements.

Fig. 13 and Fig. 14 represent characteristic curves of the functioning of a current clipper.

Fig. 15 is the circuit diagram of an elementary clipper.

Fig. 18 represents a current clipper embodying a system of automatic release.

Fig. 19 represents a direct current clipper and

Figure 20:
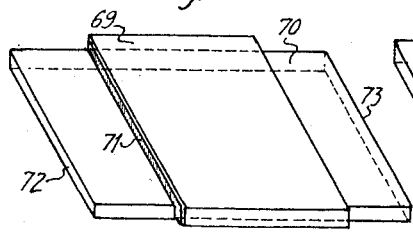
Fig. 20 and Fig. 21 represent unipolar transistors of the prior art suitable for the constitution of rectifiers and clippers according to the invention.

On Fig. 1 which shows the circuit diagram of a unipolar field-effect transistor of the prior art, 81 represents the semi-conductor rod of the transistor, 82 and 83 the terminal electrodes forming respectively the source and the drain, 84 the electrode enabling the setting-up of a transverse field within the semi-conductor, which field assures the modulation of the portion of the channel which carries the current generated by source 85. Electrodes 82 and 83 are welded to the terminals of body 81 so as to assure ohmic contact, whereas electrode 84 is insulated with respect to that body by means of a barrier surface with, possibly, an intermediate insulating film or, alternatively, by a so-called n-p junction. On electrode 84 act, on the one hand bias source 86, and on the other the signal produced by generator 87, which signal is applied, after amplification, to external load 88.

Fig. 2 shows the family of characteristic "drain voltage-drain current" curves for different gate bias voltages, $Ia$, $Va$ and $Vg$ being the drain current and voltage and the gate bias voltage respectively. These curves were recorded on the cylindrical shape transistors, therefore of the centripetal pinch-off effect type, according to my above mentioned patent.

An essential difference is observed by comparison with transistors of conventional type, for example of the junction type, in that when there is no gate bias ($V_g=0$), the resistance to the flow of current is minimum for zero drain voltage and, furthermore, decreases fairly rapidly as a reverse function of temperature. This resistance increases more and more rapidly with the drain voltage $V_a$ until the increase becomes at least linear from the instant when the saturation current $I_s$ is reached. In the case of a cylindrical shape transistor, this saturation current is practically reached for a drain voltage markedly inferior to the total pinch-off voltage $V_o$ quoted in Fig. 2.

At this stage, two features will have been noted which are favourable to the utilization of such a transistor in a current rectifying function with very low voltage drop under normal operating conditions (low forward resistance for low drain voltage) and with self-clipping capabilities. However, to enable such an application, the possibility must be provided to completely cut-off the drain current for a gate bias equal theoretically to the total pinch-off voltage $V_o$. Now, this property has been verified experimentally on cylindrical shape transistors in which, as explained before, the pinch-off effect is most marked. The corresponding curve $I_a - V_a$ for $V_g = -V_o$ practically coincides with the line of abscissas $I_a = 0$.

In the case of rectifiers and current clippers which will be described hitherto, unipolar power transistors of any type, notably those types mentioned with reference to Figs. 20 and 21, can be utilized as elements. However, it is recommended that unipolar power transistors be used, comprising a plurality of cylindrical shape rods, such as described in the above mentioned patent application of December 9, 1957.

Figure 3:
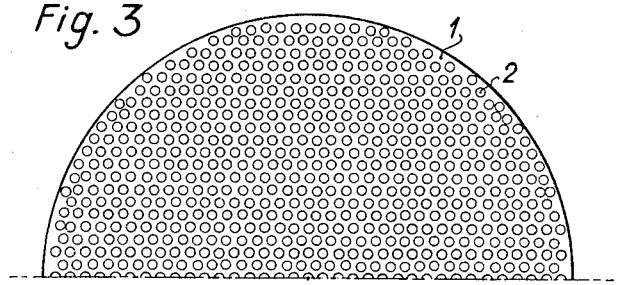
Fig. 3 and Fig. 4 represent a unipolar power transistor of the prior art described in my above-mentioned co-pending application.
Figure 4:
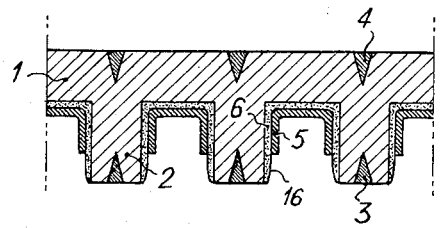

A unipolar power transistor of that type, a plan view of an element of such a transistor being represented in Fig. 3 and a partial diametrical sectional view of that element being represented to a larger scale in Fig. 4, embodies a thin plate 1 of given semiconductive material of predetermined resistivity. The surface of the plate will have an area of, for example, 5 to 10 sq. cms. and its thickness will be 0.25 to 0.30 mm. The surface of the plate is plane and carefully polished.

The plate is provided on one side with cylindrical rods or teeth 2, perpendicular to its surface, the manner in which such rods are obtained being described in the above mentioned application. The rods are laid out in regular pattern, for example, in concentric circles if plate 1 is circular or in staggered pattern if plate 1 is square or rectangular, or again, in a combination of the two patterns presenting maximum rod density, as illustrated in Fig. 3. Individual rod tips terminate into an ohmic contact 3 and a second ohmic contact 4 is located over the plane surface of the plate, across the axis of each rod. Such ohmic contacts constitute the source and the drain of the individual unipolar transistors, the functions of said drain and source being alternately reversible depending upon whether transistor is utilized in an alternating current rectifying or clipping function.

In the case represented in Fig. 4, the base of the throughs between the rods is covered by an insulating film 6 over which the continuous gate electrode 5 is deposited (adequate insulation length being however provided between 5 and 3). To the two features already mentioned, this arrangement adds a third one which is interesting for the applications covered by the present application, namely the possibility of producing an element for a working voltage of relatively high value, for example in the order of 1000 volts or even higher, largely exceeding the values of working voltage applied, until now, to elements of junction rectifiers, thereby permitting a marked reduction of the number of elements for operation with higher values of working voltages.

However, in the case when such an increase of working voltage per element is not essential, the gate electrode 5 can be deposited about the rods without the need for an intermediate insulating film. As regards the making of a complete transistor element suitable for a current rectifying or clipping device, Fig. 4 of my patent application of December 9, 1957, should be particularly referred to.

In all the diagrams of rectifiers and clippers described hitherto, input and output terminals, and more generally the terminals across which the voltage is applied, will be designated by 101 and 102.

Fig. 5 shows a theoretical diagram of the circuit of a rectifier consisting of two sets of transistors 21 and 22, connected in series. Between gate electrode 5 and "upstream" electrode 11 or 12, in each element 21 or 22, a square-wave alternating signal 23 (Fig. 6, line $a$) is applied, having an amplitude larger than $V_o$ and selected so that the voltage applied radially to the gate, subtracting the potential difference applied to the insulating film, be at least equal to that value $V_o$.

When the "upstream" electrode 11 constitutes the drain (Fig. 6c) signal 23 is positive, that is, the potential of gate 5 is positive with respect to the source. When this condition obtains, the semiconductive body being assumed to be of the n type, no pinch-off effect is exerted and the conducting channel operates over its whole section; the current flows unopposed and a minimum drop of potential is experienced. The current $I_a$ flowing through the element is represented in 24.

When, on the other hand, signal 23 is negative (Fig. 6d), that is, when the voltage of gate 5 is negative with respect to electrode 11 which now functions as the source (a fortiori, the same condition obtains with the drain), the centripetal pinch-off effect blocks the flow of current. The current flowing through the rectifier is now zero (section 25 of Fig. 6, line $b$).

Signal 23 is obtained for example as represented on Fig. 5 according to a known practice consisting in starting from a source of alternating current 26 which is synchronous with the principal source, supplying, through a large core-less inductance 27, a saturable core transformer 28. There is one such transformer per element. To obtain pulses that are of practically rectangular-shape, a relatively high value of transformer ratio will have to be selected. The adjustment of the voltage distribution in the elements over the blocked half-wave period can be easily obtained by permanently magnetizing the core of transformer 28 by means of an auxiliary winding 29, energized by an adjustable source of direct current 30. By acting in this manner on the amplitude of the negative pinch-off voltage of the individual elements, it will be easy to adjust the corresponding reverse resistances to render them relatively equal. Such an adjustment necessitates only a voltage of low value and does not require much power.

Fig. 7 shows the theoretical circuit diagram of a device assuring the cutting-off of the forward current of the rectifier in the event of an overload considered as excessive, caused, for example, by total or partial short-circuiting of the load. The principle of the device consists in injecting into the control circuit of gate 5, during the period of forward half-wave, a signal of the same rectangular shape but of opposite sign and having three times the amplitude of the normal control voltage. Fig. 8, line $a$, shows the shape 31 of the resulting control signal curve, as well as the corresponding values of minimum gate bias, respectively with respect to the drain (Fig. 8b) and to the source (Fig. 8c) over the two half-wave periods, forward and reverse, the amplitude of the reverse voltages across the terminals of the individual elements being assumed to be at least equal to $V_o$. It will be observed that such bias values are then identical, the potential of the gate being always inferior to the potential of the source by a value $V_o$, and consequently, the current remains permanently cut-off.

The complementary cut-off voltage can be supplied, as represented for instance in Fig. 7, by a saturated-core transformer 32 having its secondary winding in series with that of transformer 28, such transformer being energized by a source of alternating current 34, through a rectifier 33. The system for closing the primary winding, represented in schematic form by a three-electrode tube 35, can be provided by any device in general use, practically free of inertia, such as a thyratron or a transistor, the operation of which will be controlled by a signal set up by the excessive overload, according to one of the known systems already utilized for the grid control of mercury-vapour rectifiers.

At this stage, the basic principle of alternating current cut-off method which will be utilized later in the designing of the alternating current clipper device, is becoming obvious. The equipment of elements 21 and 22 of such a limiter is represented in the circuit diagram of Fig. 9.

To assure the maintenance of the cut-off conditions once the cut-off impulse is applied, this impulse negatively charges at a potential larger than $V_0$, a circuit comprising a capacitor 36 and a resistance 37 in parallel, connected between gate 5 and "upstream" terminal 11 in the case of "upstream" element 21 and between gate 5 and "downstream" terminal 12' in the case of "downstream" element 22'. Such a charge is obtained in the following manner:

The two elements 21 and 22' are placed between current transformers 38 and 39, which transformers are theoretically of identical design. Immediately the current exceeds the predetermined value, the voltage across the terminals of the circuit formed by resistance 44 and capacitor 40 in parallel, connected to the terminals of the secondary winding of each transformer, becomes markedly larger than $V_0$ and is large enough to initiate the firing of a unidirectional valve, for example a thyratron 42. Depending upon the polarity of the particular current half-wave over which the predetermined current limit is exceeded, either valve 42 controlled by transformer 38 or the valve controlled by transformer 39 will fire. This process will take place when the terminal adjacent to the transformer (terminal 11 for transformer 38 and terminal 12' for transformer 39) will function as the source of the corresponding element 21 or 22'. Firing of valve 42 sets up across the terminals of resistance 41 in series a shock wave which is transmitted through a rectifier 43 of normal type to the terminals of the circuit formed by capacitor 36 and resistance 37, thereby charging gate 5 to a potential negative with respect to the corresponding source. The presence of rectifier 43 is necessary to avoid the back-discharge of capacitor 36.

Thus, gate 5 is duly charged negatively with respect to the corresponding source, to a potential larger than $V_0$ and current cut-off conditions are obtained, either by element 21 or by element 22'.

Owing to the presence of capacitor 40, the time constant for the process can be made very short. In actual practice, it is dependent only upon the residual resistance of valve 42 and of rectifier 43 which may be very low. The capacitance of the charging capacitor will obviously have to be markedly larger (for example 5 to 10 times) than the capacitance of the capacitor 36 to be charged.

In the case of several elements in series, it can evidently be envisaged to control the individual elements by a secondary of one of the transformers 38 and 39, in which case such transformers will feature a number of secondaries equal to the number of elements like 21 and 22' in series. However, when the number of these elements becomes relatively large, it will be advantageous, according to the invention, to employ the method of cascade excitation represented in Fig. 10. According to this method, blocking of the first element controlled by the adjacent current transformer, as explained above, affects the other elements in succession, according to a process which is practically free of inertia and the time constant of which will be further discussed.

The device embodied in the figure comprises two chains of elements 21 and 22', the right-hand and left-hand chains being connected in series. In the first chain, the circuit formed by capacitor 36 and resistance 37 is connected to the "upstream" terminal 11 of the element, whereas in the second chain, the corresponding circuit is connected to the "downstream" terminal 12'.

Cascade excitation is obtained through use of voltage set up across the terminals of the element cut-off in the first instance to bias the gate of the following element, and so on: for example, during the current half-wave over which the impulse is generated by transformer 38, the voltage set up across terminals $11_1$ and $11_2$ by the blocking of the first element is transmitted as it builds up, via the connection from $11_1$ to the gate of the following element; the voltage that is building up across the terminals of the second element (between $11_2$ and $11_3$) is transmitted via the connection from $11_2$ to the gate of the following element, etc. The same process will take place for the right-hand chain during the following half-wave (via the connections from $12'_1$, $12'_2$, etc.).

Provided the proportion of overload voltage allocated to each element, across the terminals of the current clipper when cut-off conditions obtain is larger than $V_0$, it will be seen that each gate will now be biased at that potential assuring the complete pinch-off of the conducting channel. It will be hitherto shown that a phenomenon of self-regulation of the distribution of the working voltage in the elements then takes place, which distribution can be perfected by accessory devices, as mentioned afterwards.

However, such a device offers two drawbacks. The first drawback, which is a minor one, is that the current tends to be restored over the half-wave following that over which the initial excitation was applied and this is the time when the second chain intervenes to cut-off the current completely, since an individual chain can cut-off the current for only one half-wave. The second drawback, which is a major one, is that the device necessitates two chains in series, the voltage drops across these adding-up during normal operation. Consequently, for a given drop in voltage, each element will require twice the number of transistors in parallel, this resulting in four times the quantity of material than would normally be needed if the device embodied a single chain.

Yet, it is possible to construct such a device by referring to the method of cutting-off utilized in the rectifier shown in Fig. 8. The principle consists in biasing the gate, this time not by a voltage at least equal to $V_0$, but by twice that voltage. It will be seen (Figs. 11a and b) that, with this arrangement, cutting-off conditions will be assured whatever the half-wave: whether the terminal electrode of the element with respect to which the gate is biased is functioning as the source or the drain, the gate voltage is always at least equal to $V_0$, this condition being necessary and sufficient to assure current cut-off. The only drawback inherent to the principle is that the gate voltage with respect to one of the electrodes may reach $3V_0$ instead of $2V_0$ in the preceding circuit, but this drawback is a minor one when considered against the resulting advantages.

Fig. 12 represents the circuit diagram of this principle, under the form of an alternating current clipper embodying a single chain of elements. This chain then comprises only those circuit elements that are "upstream" with respect to capacitor 36. It is bounded by current transformers 48 and 49 which supply a voltage double that supplied by transformers 38 and 39. The "upstream" transformer 48 energizes the two initial elements $21_1$ and $21_2$, through resistance 44, capacitor 40, unidirectional valve 42, resistance 41 and high-frequency transformer 45, having two secondary windings charging the capacitors 36 of these elements through rectifiers 43. On the other hand, the "downstream" transformer 49 charges only capacitor 36 of the final element $21_n$ (where $n$ is the number of elements in the chain), but at double the voltage.

Here, cascade excitation is obtained, no longer by the voltage drop across the terminals of an element 21, which voltage drop normally exceeds the value of $V_0$, as is the case in the double-chain circuit of Fig. 10, but by the voltage drop across the terminals of two elements in series, which voltage drop is therefore larger than $2V_0$. This excitation is assured by connections leading out either to the right from terminals $11_1$, $11_2$, $11_3$, etc. to $11_{n-2}$, or to the left from terminals 12, $11_n$, $11_{n-1}$, etc. to $11_3$, depending upon whether the impulse is generated by the "upstream" transformer 48 or by the "downstream" transformer 49.

It will be noted that each element can be excited equally well by the impulse originating from one or the other side, this fact explaining why two connections terminate at each gate through rectifiers 43. The difference in the embodiment of the lateral exciting circuits and in the modes of cutting-off of the chain by impulses originating respectively from the "upstream" and "downstream" direction, results from the fact that, considered from the "upstream" direction, the capacitor is connected element is connected between the gate and the terminal nearest to the element, whereas, considered from the "downstream" end, this capacitor is connected between the gate and the terminal most remote from the element. Under such conditions, when the impulse originates from the "upstream" direction, the capacitor is connected between the gate and the terminal functioning as the source electrode for the particular half-wave of current, whereas, when the impulse originates from the "downstream" direction, the capacitor is connected between the gate and the drain electrode.

Naturally, the system for producing the initial impulse from the current transformers is mentioned here only by way of example: such an impulse can also be generated by one of the known selective protection devices used in electrical network practice, exciting either one or the other end of the chain of elements. However, a purely electronic device should be preferred so as not to lose the advantages of instantaneous current clipper operation.

It has been mentioned that self-regulation of voltage distribution in the elements is obtained through the method of cascade excitation of the elements. Immediately the voltage across the terminals of an element tends to exceed its normal allotted share, there occurs an increase of the cut-off potential of the adjacent element, and so on. In order to understand the process better, Figs. 13 and 14 should be referred to. They give as indications only, the curves representing, for an element, the drain current $I_a$ as a function of the drain voltage $V_a$ for different gate bias voltages $V_g$ (curves 46 in Fig. 13) and voltage $V_a$ as a function of $V_g$ (curve 47 in Fig. 14).

The particular shape of the curves 46 which feature a portion of negative characteristic ($dI_a/dV_a<0$), in which they differ from the curves of the transitor of Fig. 2 is explained here by the fact that, for the voltage value at which clipping must occur, the longitudinal electric field in the semi-conductive rods largely exceeds the critical field (in the order of 1000 v./cm., for example) for which the mobility of the charge carriers ceases to be constant and decreases rapidly with increasing field values, hereby causing a parallel decrease of the conductivity of the rod. Such a phenomenon can facilitate the current clipping process.

As shown in Fig. 13, the nominal working current $I_n$ (peak value) of the current clipper will cause only a negligible voltage drop not detectable in the figure, actually in the order of some ten thousandths of the nominal working voltage $V_n$. For the value of overload current controlling the operation of the current clipper, which value is assumed to be in the order of $2I_n$, this voltage drop will still be only approximately double the value of the preceding drop and still undetectable on the figure. However, immediately the gate is biased, that is, as soon as the negative value of voltage $V_g$ is increased, voltage $V_a$ increases rapidly and it will be seen that, in the example considered, the envisaged value of current i.e. $2I_n$ can no longer be obtained whatever the voltage $V_a$, as soon as the negative value of $V_g$ reaches $0.6V_o$. Fig. 14 represents clearly this variation of $V_a$ against $V_g$.

It follows that the current will tend to decrease, that simultaneously, the voltage across the terminals $V_a$ and consequently the negative bias voltage $V_g$ will increase and finally the value of $V_o$ will, at least, be reached, either over the first half-wave or, at the latest, over the next half-wave.

Despite this process of self-regulation of the voltage distribution in the elements, it might prove advantageous to perfect the process in order to prevent any risk of "uncontrolled build-up" of the voltage across any one of the elements, by shunting them with a chain of adequate resistances. Fig. 15 shows the detail of an element thus equipped and also shows the detail of the circuit embodying capacitor 36 and resistance 37.

The shunting circuit of element 21 can consist of a fixed linear resistance 52 assuring distribution up to the working voltage value, having, in parallel, a non-linear resistance 53, that is a resistance varying as an inverse function of the voltage across its terminals, correcting any possible discrepancy in the distribution at higher voltages. Purely by way of indication, for an element having a peak value of working voltage of 1000 volts, resistance 52 can be in the order of 50 ohms and resistance 53 can be of the order of 300 ohms at the working voltage, and vary in inverse proportion to the power 3 or 4 of the voltage. In this manner, the residual current at the working voltage will be only in the order of 15 amperes R.M.S.

Capacitor 36 can be shunted by a similar circuit: a fixed resistance 50, setting the time-constant of the discharge, and a non-linear resistance 51, preventing any excessive rise of voltage across the capacitor. As an indication, the following values could be used: capacitance of capacitor $36=0.1$ μf.; fixed resistance $50=1$ megohm; non-linear resistance $51=5$ megohms at the normal gate charge voltage and varying inversely with the voltage, for instance, according to an exponent 9 or 10. It should be added that such a resistance could be replaced by a small voltage clipper.

It is important to study the duration of the blocking process which conditions the efficiency of the current clipping function of such a chain of elements. The duration of the process actually amounts to that required for the charging of the corresponding capacitors 36. The charging time for the first two or for the last elements excited by the impulse originating from the current transformers is very short, as explained earlier; in actual fact, the charging time can be less than 1 microsecond. The charging of the following elements will be accomplished as the voltage is restored across the terminals; the charging time will therefore be a function of the natural frequency of the circuit in which the current clipper is functioning. However, it should be noted that the characteristics given in Figs. 13 and 14 show that the blocking action becomes effective immediately the voltage $V_g$, and therefore the charging potential across capacitor 36, reaches a fraction of the complete pinch-off voltage $V_o$. On the other hand, in the case of a single chain (Fig. 12), two elements are simultaneously excited, this causing a further reduction of the duration of the blocking time. For this reason, the current will be limited to a small fraction of the short-circuit current, even for networks having a low natural frequency.

By way of indication: for a 225 kv. network having a natural frequency in the order of 300 cycles per second, current clipping can be effective after a time period of approximately 200 μs., which means, assuming that the clipper operates for $2I_n$, that current peak clipping occurs within $4I_n$ or, at the most, within 10% of the short-circuit current.

Once current clipping is achieved, it is essential that the clipper be capable of restoring the system to normal working conditions within a predetermined period of time. This time delay is necesary for the fault, if that fault is of purely momentary nature, to suppress itself, arcing having quenched out and the arcing path being sufficiently de-ionized to permit the voltage to be restored. Now, with the equipment of the elements according to Figs. 10, 12 and 15, the restoring of normal operation cannot be automatically achieved but will necessitate the prior installation of a series electromechanically controlled circuit breaker featuring rapid make and break operation, assuring the breaking of the residual current and suppressing the voltage across the current limiter as well as the restoring of the circuit to normal working conditions. With such a circuit breaker, the circuit: current clipper and circuit breaker, functions in the following manner:

Circuit breaking is controlled simultaneously with the excitation of the current clipper (by the common current transformer, for example). The potential across the limiter being suppressed, capacitors 36 discharge into their respective shunting resistances 37, for example according to a time constant of 0.1 μs. The circuit breaker automatically operates afterwards, for example 0.15 μs., the current clipper being now ready to revert to normal working conditions, that is, to let the current through or to operate again if the fault persists.

This solution is valid but it is costly and, in addition, somewhat contrary to the static principle of the device. To obviate these drawbacks, the invention offers an alternative solution which is purely static and which features complete automaticity.

Its principle is derived from that of the cascade blocking of the elements of the clipper triggered by an impulse at one end of the chain. Clipper release is also achieved by means of an impulse which is obtained, in this case, not by the charging, but by the discharging of one or of several capacitors 36. In order to utilize such a discharge and the resulting voltage drop to initiate the sudden discharge of the other elements in the chain, the properties are used of a unipolar transistor the resistance of which drops considerably when the bias voltage diminishes.

Figure 16:
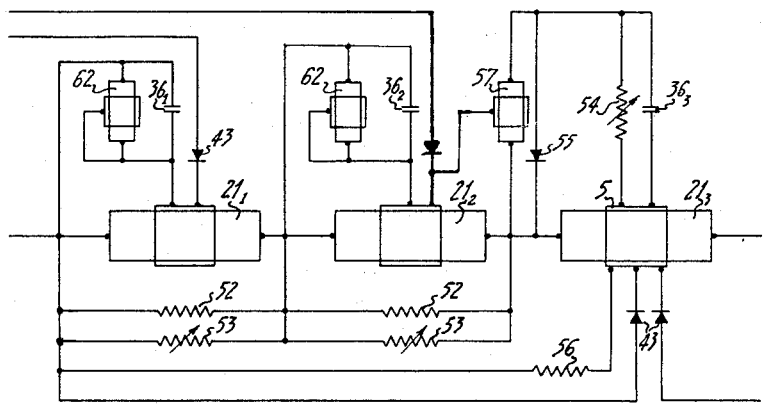
Fig. 16 and Fig. 17 represent a basic current clipper embodying an automatic release system operating within a predetermined time delay and a diagram of interconnection with the basic limiters adjacent to the chain.

In this solution (Fig. 16), only the first two elements $21_1$ and $21_2$ feature capacitors that discharge spontaneously after the initial charge. These capacitors can discharge into fixed resistances or, better, into a small unipolar transistor element 62, the gate of which is connected to the cathode. It has been shown on curve $V_g=0$ on Fig. 13 that the resistance of such a transistor decreases when the voltage $V_a$ decreases. This property, applied to the discharge of a capacitor, assures a rate of discharge relatively slow at first and then rapidly accelerating, assuring fairly sharp release after a time delay which can be set with precision. To ensure this condition, all other elements are equipped as represented in Fig. 16 for element $21_3$.

Here, capacitor $36_3$ of element $21_3$ is shunted only by a non-linear resistance 54, the sole purpose of which is to limit the voltage across its terminals. On the other hand, it features a small rectifier 55 in series which rectifier prevents the capacitor from discharging through resistance 56. Rectifier 55 is shunted by a transistor 57 which is biased negatively by the voltage across the terminals of capacitor $36_2$ of the adjacent element to the left. During cut-off conditions, the bias voltage notably exceeds $V_o$, as long as the bias voltage remains at least equal to that value, the transistor practically behaves like an infinite resistance, but as soon as it falls below that value, the resistance of the transistor decreases sharply, whence a rapid discharge of capacitor $36_3$ through transistor 57, the resistances of adjacent elements and resistance 56. To understand this operation better, reference will be made to Fig. 17 where the case will be considered, by way of example, of capacitor $36_3$ of element $21_3$ immediately following the first two elements $21_1$ and $21_2$ excited through rectifiers 43 by the impulse supplied by the current transformer.

Figure 17:
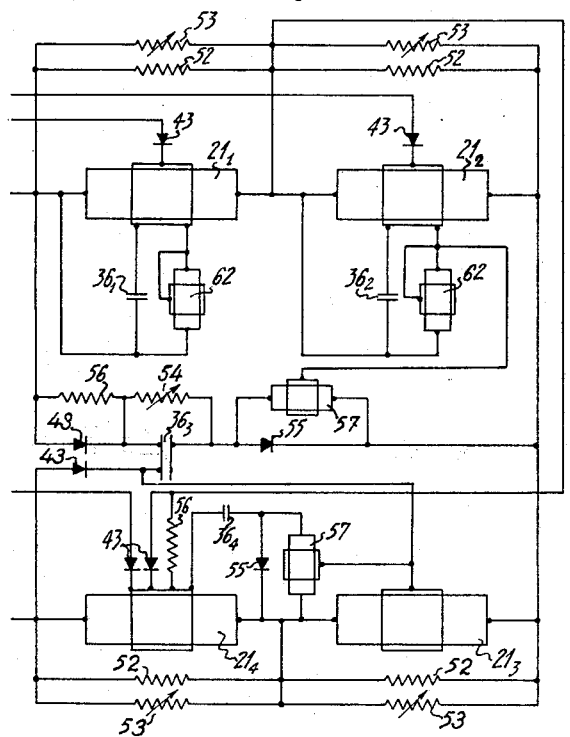

Fig. 17 represents the essential portions of the diagram of the four elements $21_1$, $21_2$, $21_3$, $21_4$ necessary for an easy understanding of the following explanations. Capacitor $36_3$ is supplied through rectifiers 43 over one half-wave at the potential across the terminals of elements $21_1$ and $21_2$ and over the other half-wave at the potential across the terminals of elements $21_3$ and $21_4$. Thus, a forward current is always flowing through rectifier 55. However, capacitors $36_1$ and $36_2$ discharge through their respective shunting resistances 62, which resistances will preferably consist, as mentioned earlier, of a unipolar transistor having its gate electrode connected to the source, so as to assure a rate of discharge which is at first slow and then accelerates rapidly. At a given instant, elements $21_1$ and $21_2$ are sufficiently unblocked for the potential across their terminals to become practically negligible; simultaneously, transistor 57 shunting the rectifier 55 loses its bias. Capacitor $36_3$ then discharges suddenly through this transistor, the natural resistances of elements $21_1$ and $21_2$ and through resistance 56. The value of this last resistance is selected so that it is high with respect to the forward resistance of rectifier 43 and markedly higher than shunting resistances 52—53 of the elements, so as not to perturb the charge across capacitor $36_3$ during cut-off conditions, but sufficiently low to reduce to a minimum the discharging time-constant of that capacitor.

In the aforesaid example, the value of that resistance 56 can be 200 ohms, thereby giving, with a capacitance of 0.1 μf., for capacitor $36_3$, a time-constant in the order of 20 μs. However, half-way through this time period, the voltage across the terminals of capacitor $36_3$ will have dropped sufficiently to unblock the element $21_3$ and also to remove the bias from transistor 57 of element $21_4$. Thereafter, the sharp discharge of capacitor $36_4$ will be initiated, and so on. It is therefore evident that the whole unblocking process can be completed over a period of time notably under one half-wave.

In the above exposition, it was implicitly assumed that:

(a) Capacitors $36_1$ and $36_2$ of elements $21_1$ and $21_2$ were always charged, whatever the sign of the current half-wave during which the fault developed.

(b) This charge was not held by the "back"-excitation during the cut-off conditions, as it is the case for the other elements in the chain, but could disappear spontaneously. This necessitates a modification of the current transformer exciting these two elements and of the supply of the corresponding capacitors 36. Fig. 18 which gives the circuit diagram of the chain thus equipped, shows the set of modifications made with reference to the diagram of Fig. 12.

The "upstream" transformer 48 is replaced by transformer 58, the secondary winding of which features a center tap: with this arrangement, whatever the current half-wave, one of the capacitors 40 or 40' will be always charged negatively. When the charging voltage exceeds the corresponding firing voltage of valve 42 or 42', this valve operates and generates an impulse which charges, through the high frequency transformer 45, the capacitors $36_1$ and $36_2$ of the first two elements $21_1$, and $21_2$. On the other hand, these elements are charged only by this impulse; no connection from other elements in the chain terminates into these two elements. The other modifications have already been described earlier.

The alternating current clipper embodying the above circuit is capable of clipping the short circuit current at a value which is practically harmless and to assure the automatic restoring of normal working conditions within a predetermined delay, remaining ready to operate should the fault subsist. This cycle of operation is repeatable at will. A direct-current clipper can obviously be produced on the same principles. In this case, the problem is even more simple, due to the fact that the respective positions of the drain and source are permanent. For that reason, the circuit diagram can be considerably streamlined. Fig. 19 gives the principle. By way of indication, the current clipper represented in the diagram is suitable for application in a direct-current network of 1500 to 2000 volts.

Such a current clipper comprises three identical elements $61_1$, $61_2$, $61_3$, the internal embodiment of which can be the same as that of the elements of the alternating current clipper already described.

The interval between the gate and the source of the individual elements is shunted by a capacitor, respectively $60_1$, $60_2$, $60_3$. There is, in parallel with that capacitor, for the first "upstream" element a resistance 62 consisting of a unipolar transistor having its gate connected to the source, and for the following elements, another unipolar transistor $63_2$, $63_3$ having its gate controlled by the voltage from capacitor 60 of the adjacent "upstream" element.

The initial impulse can be generated by a transformer 68 having its secondary winding shunted by an impedance 64, preferably comprising a capacitance of a value larger than that of capacitor 60. In normal working conditions, with constant current, the voltage across the terminals of the secondary is zero; variations of current set up a voltage of varying value across these terminals. It is known that normal and abnormal overloading can be differentiated from the corresponding value of the derivative of the current with respect to time ($di/dt$) or, again, from the amplitude of the current variation ($\Delta i$) or, again, by these two criteria together; this will be obtained, according to known methods, through an adequate choice of the characteristics of that impedance 64.

A unidirectional electric valve (thyratron 65) is connected across this impedance, in series with a resistance 66 across which is placed the capacitor 60 of the first element $61_1$ through the rectifier 67.

From the above, the operation of the circuit is easily understood. The normal overload sets up across the impedance 64 a voltage of suitable sign and having an amplitude sufficient to fire valve 65. When this valve strikes, a voltage impulse sets up across resistance 66 charging capacitor $60_1$ through rectifier 67, of the first "upstream" element $61_1$. This capacitor can charge up very rapidly owing to the capacitance value of the capacitor included in the circuit of impedance 64. The charging voltage exceeds the voltage value of complete pinch-off $V_o$.

The charge across capacitor $60_1$ of this first element blocks this element, this initiating according to the process of cascade operation already explained with reference to the alternating current clipper, the charging of capacitor $60_2$ of the "downstream" element through the corresponding rectifier $67_2$ and so on, for the third element in the case considered. It will therefore be seen that current clipping is practically instantaneous (the duration of the process is in the order of hardly a few microseconds) from the instant valve 65 strikes. The time-constant of the system is practically that of transformer 68 and of impedance 64.

Restoring of normal working conditions within a predetermined delay can, here also, be achieved through the use of a circuit breaker in series. In this case, capacitors $60_1$, $60_2$, $60_3$ would be shunted by simple fixed resistances. On the other hand, it is, in this particular case, very easy to obtain completely automatic restoring of the working conditions; shunting by transistors 62—$63_2$—$63_3$ represented in Fig. 19 corresponds to this latter possibility. In this case, the system operates as follows:

Capacitor $60_1$ of the first "upstream" element $61_1$ discharges according to the time-constant of the circuit $60_1$—62; the rate of discharge is relatively slow at first and accelerates with the decrease in voltage across $60_1$. As long as this voltage remains larger or in the order of $V_o$, element $61_1$ remains cut-off and, on the other hand, transistor $63_2$ shunting capacitor $60_2$ of the following element $61_2$ also remains cut-off. After a certain delay, the voltage across capacitor $60_1$ of the first element drops sharply and reaches a range of potential corresponding to the release conditions for that element.

Simultaneously, transistor $63_2$ of the second element is unblocked and initiates a sudden discharge of the corresponding capacitor $60_2$, releases element $61_2$ and, practically simultaneously, releases the third element and other elements if required, according to an identical process. The current clipper is obviously ready to operate again should the cause of its first operation subsist.

To fix ideas, some quantitative indications must be given on the embodiment of the alternating and direct current rectifiers and clippers which are the object of this invention.

By way of examples, the following cases will be considered:

(a) A rectifier capable of supplying 4000 amperes at 1500 to 2000 volts direct current;

(b) A direct current clipper capable of operating under such conditions;

(c) An alternating current clipper designed for operation at 4000 a. R.M.S. and 17.5 kv., 3-phase operation.

(a) and (b) The rectifier can embody three elements in series. The voltage drop across its terminals for the nominal current can be reduced to a value of 2 volts. If it is assumed, still by way of example, that germanium is utilized as the semi-conductive material, the quantity of that material required for the embodiment of either the rectifier or the clipper, which is practically the same, is in the order of 1 kg.

(c) The alternating current clipper for the working conditions envisaged will embody some twenty elements in series. The voltage drop across the terminals for the nominal current can be lowered to below 10 volts R.M.S. per phase. Assuming again that, by way of example, germanium is used as the semi-conductive material, the quantity of material required for the embodiment of the elements of such an alternating current clipper is in the order of 10 kg. for a 3-phase device.

Figure 21:
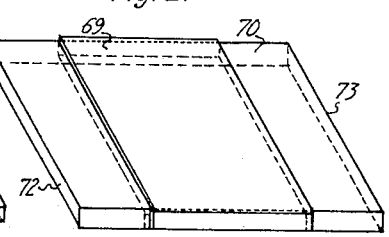

Figs. 20 and 21 recall the structure of known unipolar transistors which can possibly be utilized for the embodiment of the elements of the rectifiers and clippers of the invention. Their structure is parallelepiped. In Fig. 20, the gate electrode 69 is deposited over the plate 70 after an intermediate insulating film 71 is laid over the plate. 72 and 73 represent the terminal electrodes. In Fig. 21, the gate electrode 69 is deposited directly over the plate 70, either by galvanoplasty or by vacuum diffusion of a doping element giving impurities of a type opposite to those existing in the plate, for example, borium if the plate is in germanium, silicon or in intermetallic composition, III–V of type n, or phosphorus or arsenic if the plate is made of a semi-conductive body of the same nature but of type p. In the case of vacuum diffusion, an n-p junction is produced, through which the field-effect of electrode 69 is produced.

Although the invention was described according to concrete examples of embodiment, it should be understood that other alternatives, easily conceivable for the man skilled in the art, are possible and that such alternatives belong to the domain of the invention.

What I claim is:

1. A clipping device for electrical alternating current supply line comprising two field-effect transistors having each two ohmic electrodes and a gate electrode, said transistors being connected in series across said line, a given ohmic electrode of each transistor constituting internal electrodes and being connected therebetween and the other ohmic electrode of each transistor constituting external electrodes and being connected to the line, means respectively located across the line on the external electrode sides and adapted to derive from an overload current in said line two signals having both an amplitude at least equal to the complete pinch-off voltage of said transistors, means for respectively applying said signals between the gate and external electrodes of each transistor and resistor-capacitor circuits connecting said gate electrodes of said transistors to the line.

2. A clipping device for electrical alternating current supply line to be inserted in series across said supply line between first and second terminals thereof comprising two pluralities of field effect transistors, having each an ohmic internal electrode and an ohmic external electrode and a gate electrode, leads connecting the internal transistor paths between a pair of said ohmic electrodes in tandem transmission relation to form two series chains, the internal electrode of one transistor in each series chain being connected to the external electrode of the subsequent transistor, the external electrode of the first transistor of the first series chain being connected to said first terminal, the external electrode of the first transistor of the second series chain being connected to said second terminal and the two internal electrodes of the last transistor of the two series chains being connected therebetween connected to said first and second terminals for deriving from an overload current in said line first and second signals having both an amplitude at least equal to the complete pinch-off voltage of the transistors, means for applying said first signal between the gate and external electrodes of the first transistor in the first series chain and said second signal between the gate and external electrodes of the first transistor in said second series chain, leads connecting the external electrode of a transistor of a given order in each series chain to the gate electrode of the transistor of the subsequent order in the same series chain and resistor-capacitor circuits connecting the gate electrodes of the transistors to their external electrodes.

3. A clipping device for electrical alternating current supply line to be inserted in series across said supply line between first and second terminals thereof comprising a plurality of field-effect transistors having each an ohmic internal electrode and an ohmic external electrode and a gate electrode, leads connecting the internal transistor paths between a pair of said ohmic electrodes in tandem transmission relation to form a series chain, the internal electrode of one transistor in the series chain being connected to the external electrode of the subsequent transistor, the external electrode of the first transistor of the series chain being connected to said first terminal and the internal electrode of the last transistor of the series chain being connected to said second terminal, first and second means inserted in series across the parts of the line connected to said first and second terminals for deriving from an overload current in said line a first and a second signals having both an amplitude at least equal to two times the complete pinch-off voltage of the transistors, means for applying the first signal between the gate and external electrodes of respectively the two first transistors of the series chain, means for applying the second signal between the gate and external electrodes of the last transistor, leads connecting the external electrode of a transistor of a given order $p$ to the gate electrode of the transistor having the order $p+2$ and to the gate electrode of the transistor having the order $p-2$ and resistor-capacitor circuits connecting the gate electrodes of the transistors to their external electrodes.

4. A clipping device for electrical alternating current supply line to be inserted in series across said supply line between first and second terminals thereof comprising a plurality of field-effect transistors having each an ohmic internal electrode and an ohmic external electrode and a gate electrode, leads connecting the internal transistor paths between a pair of said ohmic electrodes in tandem transmission relation to form a series chain, the internal electrode of one transistor in the series chain being connected to the external electrode of the subsequent transistor, the external electrode of the first transistor being connected to said first terminal and the internal electrode of the last transistor being connected to said second terminal means respectively inserted in series across the parts of the line connected to said first and second terminals for deriving from an overload current in said line a first and a second signals having both an amplitude at least equal to two times the complete pinch-off voltage of the transistors, means for applying the first signal between the gate and external electrodes of respectively the two first transistors of the series chain, means for applying the second signal between the gate and external electrodes of the last transistor, leads connecting the external electrode of a transistor of a given order $p$ to the gate electrode of the transistor having the order $p+2$ and to the gate electrode of the transistor having the order $p-2$ and circuits formed by a linear resistance, a non linear resistance and a capacitor in parallel connecting the gate electrodes of the transistors to their external electrodes.

5. A clipping device for electrical alternating current supply line to be inserted in series across said supply line between first and second terminals thereof comprising a plurality of field-effect transistors having each an ohmic internal electrode and an ohmic external electrode and a gate electrode, leads connecting the internal transistor paths between a pair of said ohmic electrodes in tandem transmission relation to form a series chain, the internal electrode of one transistor in the series chain being connected to the external electrode of the subsequent transistor, the external electrode of the first transistor being connected to said first terminal and the internal electrode of the last transistor being connected to said second terminal means respectively inserted in series across the parts of the line connected to said first and second terminals for deriving from an overload current in said line a first and a second signals having both an amplitude at least equal to two times the complete pinch-off voltage of the transistors, means for applying the first signal between the gate and external electrodes of respectively the two first transistors of the series chain, means for applying the second signal between the gate and external electrodes of the last transistor, leads connecting the external electrode of a transistor of a given order $p$ to the gate electrode of the transistor having the order $p+2$ and to the gate electrode of the transistor having the order $p-2$ and circuits, formed by a capacitor and a field-effect transistor having its gate electrode connected to its source electrode in parallel with said capacitor, connecting the gate electrodes of the power field-effect transistors to their external electrodes.

6. A clipping device for electrical direct current supply line having positive and negative terminals comprising a plurality of field-effect transistors having each two ohmic electrodes, comprising a source electrode and a drain electrode, and a gate electrode, said transistors being connected in series across said line, the source electrode of the first transistor being connected to the negative terminal of the line and the drain electrode of the last transistor to the positive terminal of said line, means located on one side of the line and adapted to derive from an overload current in the line a signal having an amplitude at least equal to the complete pinch-off voltage of the transistors, means for applying said signal between the gate and one ohmic electrode of the transistor located at the said side of the line, leads connecting one ohmic electrode of a transistor of a given order to the gate electrode of the transistor of the subsequent order and resistor capacitor circuits connecting the gate electrodes of the transistors to one of their ohmic electrodes.

7. A clipping device for electrical direct current supply line having positive and negative terminals comprising a plurality of field-effect transistors having each two ohmic electrodes, comprising a source electrode and a drain electrode, and a gate electrode, said transistors being connected in series across said line, the source electrode of the first transistor being connected to the negative terminal of the line and the drain electrode of the last transistor to the positive terminal of said line, means located on one side of the line and adapted to derive from an overload current in the line a signal having an amplitude at least equal to the complete pinch-off voltage of the transistors, means for applying said signal between the gate and one ohmic electrode of the transistor located at the said terminal of the line, leads connecting one ohmic electrode of a transistor of a given order to the gate electrode of the transistor of the subsequent order, circuits associated with said field-effect transistors formed by a capacitor and a supplementary field-effect transistor connected in parallel therebetween connecting the gate electrodes of the field effect transistors to one of their ohmic electrodes and leads connecting the gate of a field-effect transistor of a given-order to the gate of the supplementary field-effect transistor relative to the circuit associated with the field-effect transistor of the subsequent order.

8. A device for controlling the amplitude of an electrical current flowing through a supply line comprising a plurality of field-effect transistors having each two ohmic electrodes and a gate electrode, said transistors being connected therebetween by their ohmic electrodes and being in series across said line, at least one means in series with said line responsive to the electrical current amplitude and adapted to derive from said amplitude a signal voltage having a value at least equal to the complete pinch-off voltage of said field-effect transistors, means for applying said signal voltage to the gate of at least a field-effect transistor of said plurality and means for applying in cascade relationship the potential of an ohmic electrode of a given field-effect transistor to the gate electrode of another field-effect transistor in said plurality.

9. A rectifier device for electrical alternating current supply line comprising a plurality of field-effect transistors having each two ohmic electrodes and a gate electrode, said transistors being connected therebetween by their ohmic electrodes and being in series across said line, at least one means associated with said line responsive to the polarity of said alternating current in said line and adapted to derive from said current pulses cophasal with and having a duration equal to the half period of the same, said pulses having an amplitude at least equal to the complete pinch-off voltage of said field-effect transistors, means for applying said pulses to the gate of at least a field-effect transistor of said plurality and means for applying in cascade relationship the potential of an ohmic electrode of a given field-effect transistor to the gate electrode of another field-effect transistor in said plurality.

10. A device for controlling the amplitude of an electrical current flowing through a supply line designed for being inserted in series across said line comprising a plurality of field-effect transistors having each two ohmic terminal electrodes and rectifying contact gate electrode adapted to receive control signals, leads connecting the internal transistor paths between a pair of said ohmic electrodes in tandem transmission relation to form a series chain constituting, in the absence of control signals, a conductive path for the electrical current, at least one means in series with said line responsive to the electrical current amplitude and polarity and adapted to derive from said amplitude and polarity a signal voltage having a value at least equal to the complete pinch-off voltage of said field-effect transistors, means for applying said signal voltage to the gate electrode of at least a field-effect transistor of said plurality of in the reverse direction of the rectifying contact constituted by said gate electrode and transistor body and means for applying in cascade relationship the potential of an ohmic electrode of a given field-effect transistor to the gate electrode of another field-effect transistor in said plurality.

11. A device for controlling the amplitude of an electrical current flowing through a supply line designed for being inserted in series across said line comprising a plurality of field-effect transistors having each two ohmic terminal electrodes and rectifying contact gate electrode adapted to receive control signals, leads connecting the internal transistor paths between a pair of said ohmic electrodes in tandem transmission relation to form a series chain constituting, in the absence of control signals, a conductive path for the electrical current, at least one means in series with said line responsive to the difference between the electrical current actual intensity and a reference intensity level and adapted to derive from said difference a signal voltage having a value at least equal to the complete pinch-off voltage of said field-effect transistors, means for applying said signal voltage to the gate electrode of at least a field-effect transistor of said plurality in the reverse direction of the rectifying contact constituted by said gate electrode and transistor body and means for applying in cascade relationship the potential of an ohmic electrode of a given field-effect transistor to the gate electrode of another field-effect transistor in said plurality.

References Cited in the file of this patent

UNITED STATES PATENTS

| | | |
|---|---|---|
| 2,666,814 | Shockley | Jan. 19, 1958 |
| 2,825,822 | Huang | Mar. 4, 1958 |
| 2,836,797 | Ozarow | May 27, 1958 |
| 2,868,455 | Bruce et al. | Jan. 13, 1959 |
| 2,869,000 | Bruce | Jan. 13, 1959 |
| 2,885,572 | Felker | May 5, 1959 |
| 2,891,171 | Shockley | June 16, 1959 |